Aug. 16, 1927.
E. ALIBERT
1,638,906
AUTOMATIC RELEASING AND BRAKING DEVICE FOR NAILING MACHINES
Filed Dec. 12, 1925
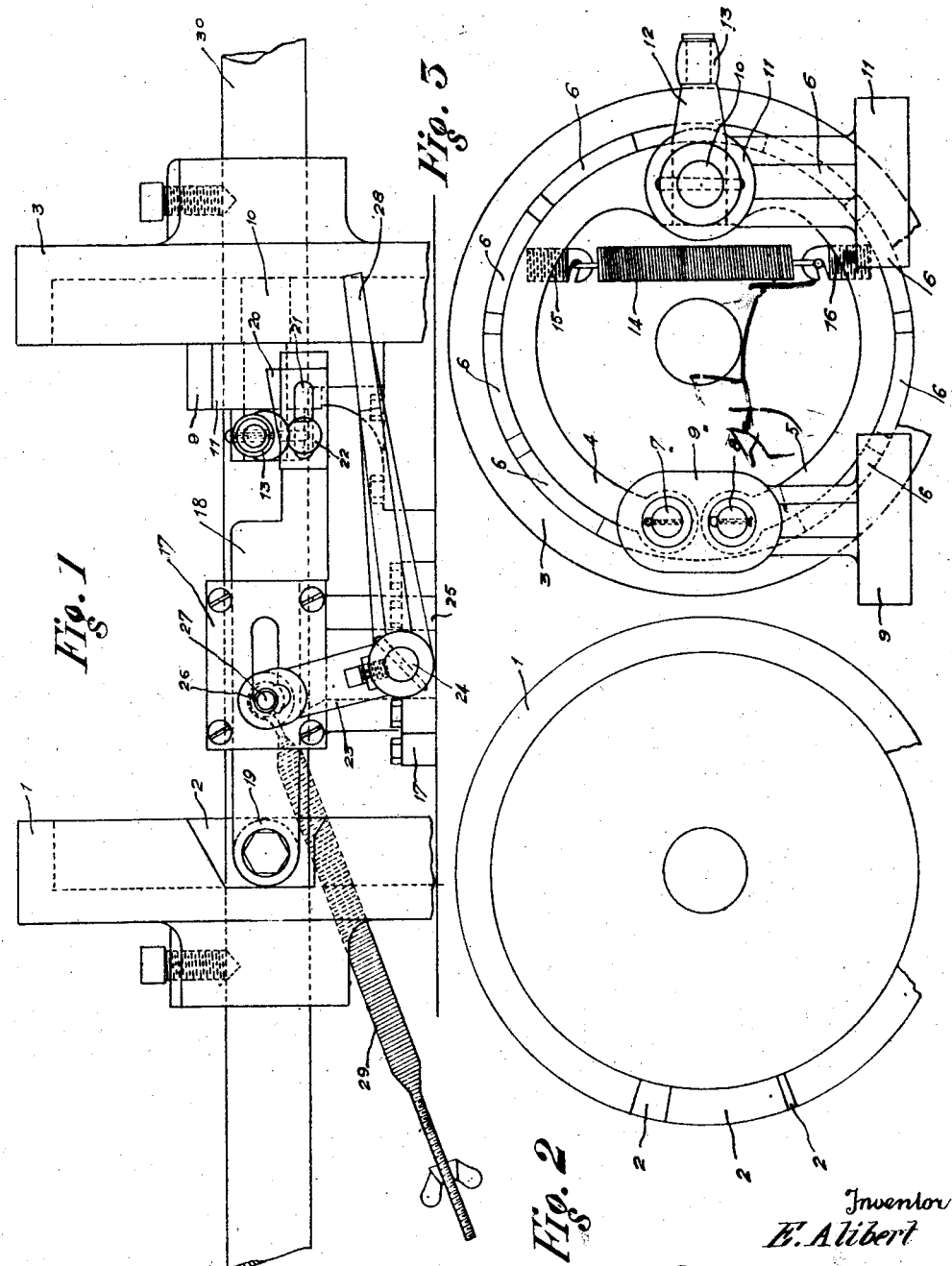
Inventor
E. Alibert
By Lacey & Lacey
Attorneys Patented Aug. 16, 1927.

1,638,906

UNITED STATES PATENT OFFICE.

EMILE ALIBERT, OF PARIS, FRANCE.

AUTOMATIC RELEASING AND BRAKING DEVICE FOR NAILING MACHINES.

Application filed December 12, 1925, Serial No. 75,092, and in France December 12, 1924.

The present invention relates to an automatic releasing and braking device.

The particular features of the invention consist in the means employed for maintaining the friction element of the controlling device in contact after the foot has been removed from the pedal, also for releasing the same, and for holding the mechanism by a sudden braking when the unclutching occurs.

In the appended drawings:

Fig. 1 is a complete general front view of the apparatus in half size.

Fig. 2 is a view of the interior of the drum with stop notch for the friction element and of the releasing means for the latter.

Fig. 3 shows a complete braking element, with its supports.

The complete apparatus comprises the following parts:

1. A cast iron drum 1 which is mounted on the driving shaft and in which is formed the notch 2.

2. A complete braking device consisting of a cast iron drum 3 mounted on the driving shaft, two brake shoes 4 and 5 (faced with Ferrodo friction material) pivoted on their axles 7 and 8 in the apertures of a cast iron support 9 mounted on the machine; a cylindrical shaft 10 at whose end is formed a flat part engaged between the contact faces of the shoes 4 and 5, for controlling the same; the said shaft is pivoted in a cast iron support 11 mounted on the machine and is actuated by the lever 12 having on the end a roller 13. The brake shoes are held in contact with the shaft 10 by a spring 14 secured to the adjustable supports 15 and 16.

3. A controlling device which is constructed as follows. A cast iron support 17 is mounted on the machine and in the said support is slidable the steel supporting member 18 upon which are mounted on the left the controlling roller 19 and on the right the steel ramp 20 which can be adjusted through the aperture 21 and is maintained by the screw 22; the said ramp controls the shaft 10 (for actuating the brakes) by sliding below the roller 13 on the shaft, at the exact moment at which the roller 19 enters the notch 2.

The supporting member 18 is actuated by the lever 23 mounted on the shaft 24; the latter is held in two bearings 25 secured to the machine frame. In the upper end of the lever is formed a notch engaging a roller 26 pivoted upon a pin 27 secured to the steel support 18 and serving to actuate the latter.

The whole apparatus is controlled by the pedal 28 mounted on the shaft 24. When the pedal is pressed by the foot, the roller 19 is brought upon the drum 1 and this assures the contact of the friction device controlling the machine—which is actuated by a lever mounted on the shaft 24—by holding the support 18 in the operative position. In this position, the ramp 20 is entirely released, and the brake is thrown off. When the driving shaft 30 has made a complete revolution and thus brings the notch 2 into coincidence with the roller 19, the support 18 is suddenly brought back by the spring 29 (secured to the lever actuating the friction device); at this moment the said friction device is released and the ramp 20 operates the shaft 10 controlling the said brake shoes, thus holding the machine in the fixed position.

I claim:

1. A combined releasing and braking device for nailing machines, comprising a drum mounted on the driving shaft, a notch formed in said drum, a second drum mounted on said shaft, brake shoes disposed in the second drum and pivoting on a support mounted on the nailing machine, a shaft having a flat end disposed between the free portions of the said shoes and pivoted on a support of the machine, a lever with a roller controlling the said shaft, a ramp coacting with said roller, a guide carrying the said ramp, means for adjusting the said ramp upon its guide, a supporting element of the machine forming a guideway for the said guide, a roller mounted at the other end of the guide from the ramp and adapted at each revolution of the driving shaft to engage the notch in the first mentioned drum, and means for controlling the said guide.

2. A combined releasing and braking device for nailing machines, comprising a drum mounted on the driving shaft, a notch formed in said drum, a second drum mounted on said shaft, brake shoes disposed in the second drum and pivoting on a support mounted on the nailing machine, a shaft having a flat end disposed between the free portions of the said shoes and pivoted on a support of the machine, a lever with a roller controlling the said shaft, a ramp coacting with said roller, a guide carrying the said ramp, means for adjusting the said ramp upon its guide, a supporting element of the machine forming a guideway for the said guide, a roller mounted at the other end of the guide from the ramp and adapted at each revolution of the driving shaft to engage the notch in the first mentioned drum, a lever having a stationary axle adapted to actuate the said guide, a notch in the outer end of said lever, a roller mounted on an axle pin of the said guide and inserted into the said slot and into an aperture of the said guideway, a pedal controlling the axle of the lever for the release of the roller of the guide from the notch on the first-mentioned drum, means for returning the said guide against the action of the lever, and means for controlling the driving shaft by friction of the brake shoes, upon release of the pedal.

Signed at Paris in the county of Seine, France this twenty-seventh day of November, 1925.

EMILE ALIBERT.